United States Patent
Masuda et al.

(10) Patent No.: US 7,517,567 B2
(45) Date of Patent: *Apr. 14, 2009

(54) TRANSPARENT TOUCH PANEL AND A METHOD OF MANUFACTURING THE SAME

(75) Inventors: Tomoki Masuda, Ibaraki (JP); Mitsuru Harada, Katano (JP); Kazunori Omoya, Hirakata (JP); Kazuhiko Fujikawa, Kyotanabe (JP); Toshiharu Fukui, Nara (JP); Takuya Yagasaki, Ikeda (JP)

(73) Assignee: Panasonic Corporation, Osaka (JP)

( * ) Notice: Subject to any disclaimer, the term of this patent is extended or adjusted under 35 U.S.C. 154(b) by 269 days.

This patent is subject to a terminal disclaimer.

(21) Appl. No.: 10/392,829

(22) Filed: Mar. 21, 2003

(65) Prior Publication Data

US 2003/0214619 A1   Nov. 20, 2003

(30) Foreign Application Priority Data

Mar. 26, 2002   (JP) .............................. 2002-085263

(51) Int. Cl.
  *C09K 19/00*   (2006.01)
  *G09G 3/36*   (2006.01)
  *G02F 1/1335*   (2006.01)
  *G06F 3/041*   (2006.01)

(52) U.S. Cl. ...................... 428/1.5; 428/1.52; 428/1.53; 349/12; 345/173; 200/512; 178/18.03

(58) Field of Classification Search ................... 428/1.5, 428/1.52, 1.53, 1.54; 349/12; 345/173; 200/512; 178/18.03
See application file for complete search history.

(56) References Cited

U.S. PATENT DOCUMENTS

| | | | |
|---|---|---|---|
| 5,955,198 A * | 9/1999 | Hashimoto et al. .......... 428/414 |
| 6,559,902 B1 | 5/2003 | Kusuda et al. | |
| 6,831,241 B2 * | 12/2004 | Fukui et al. ................. 200/512 |
| 2001/0020985 A1 * | 9/2001 | Hinata ......................... 349/12 |

FOREIGN PATENT DOCUMENTS

| EP | 1067454 A1 * | 1/2001 |
|---|---|---|
| JP | 4-123728 | 4/1992 |
| JP | 4-143823 | 5/1992 |
| JP | 10-199367 | 7/1998 |
| JP | 03/005390 | 1/2003 |
| TW | 446976 | 7/2001 |

* cited by examiner

*Primary Examiner*—Donald Loney
(74) *Attorney, Agent, or Firm*—Wenderoth Lind & Ponack, L.L.P.

(57) ABSTRACT

An optically transparent touch panel includes an upper substrate provided with an upper conductive layer formed on a lower surface thereof, and a lower substrate provided with a lower conductive layer formed on an upper surface thereof in a manner to confront the upper conductive layer with a predetermined space. The upper and lower substrates are bonded together with a spacer having a modulus of elasticity between $10^4$ and $10^6$ Pa. The touch panel has a long usable life with the capability of downsizing the whole body, while maintaining a required effective operating area.

10 Claims, 1 Drawing Sheet

TRANSPARENT TOUCH PANEL AND A METHOD OF MANUFACTURING THE SAME

FIELD OF THE INVENTION

The present invention relates to an optically transparent touch panel used for operating a variety of electronic devices. The invention also relates to a method of manufacturing the touch panel.

BACKGROUND OF THE INVENTION

There has been rapid progress in performance and diversification of electronic devices in recent years. In pace with the progress, there has been an upward surge in number of devices equipped with optically transparent touch panels in front of display devices such as LCD's and the like. In any such device, a user visually catches and selects characters, marks, signs, and the like displayed in a display device through a touch panel, and switches individual functions by operating the optically transparent touch panel.

Referring to FIG. 2, a description is provided of a conventional optically transparent touch panel of such kind. FIG. 2 is a sectional view of a conventional optically transparent touch panel. In the figure, optically transparent upper substrate 11 is provided with optically transparent upper conductive layer 12 formed on a lower surface thereof. A pair of upper electrodes 17 is provided at both ends of the upper conductive layer 12. In addition, optically transparent lower substrate 13 is provided with optically transparent lower conductive layer 14 formed on a upper surface thereof in the like manner as the upper conductive layer 12. A pair of lower electrodes 18 is provided on a upper surface of the lower conductive layer 14 at both ends thereof in the like manner as the upper electrodes 17, but in a direction orthogonal to the upper electrodes 17. Also formed are plurality of dot spacers 15 at regular intervals in order to maintain a predetermined space from the upper conductive layer 12. Spacer 16, which develops adhesion by heat curing, is composed of bisphenol A type epoxy resin having $3.2 \times 10^7$ Pa in modulus of elasticity. The spacer 16 is formed into a frame-like shape on any of the lower surface of upper substrate 11 and the upper surface of lower substrate 13 along the periphery thereof. The spacer 16 thus bonds together the upper substrate 11 and the lower substrate 13 along their periphery in a manner that the upper conductive layer 12 and the lower conductive layer 14 confront with respect to each other with a predetermined space between them. The optically transparent touch panel is constructed as described above.

In the structure described above, the upper electrodes 17 and the lower electrodes 18 are connected to a detector circuit of an electronic device. When the user depresses any point in an effective operational area of the touch panel with a finger, pen and the like, the upper substrate 11 deforms around the depressed point. This causes the upper conductive layer 12 to come into contact with the lower conductive layer 14. The depressed point is determined by detecting a ratio of resistances between the upper electrodes 17 as well as that of the lower electrodes 18. In this instance, the effective operational area defines an upper surface area of the upper substrate 11 other than a portion bonded by the spacer 16, and it is the area available for depressing operation and detection of the depressed point.

In the above-discussed optically transparent touch panel of the prior art, however, the upper conductive layer 12 receives a large bending stress around an edge of the spacer 16 when a depressing force is applied in the vicinity of the spacer 16, and this stress becomes greater the closer the depressed point is to the spacer 16. Since this stress tends to accelerate fatigue of the upper conductive layer 12, an area near the spacer 16 cannot be used as the operational area of the optically transparent touch panel. As a result, the effective operational area is restricted by this portion of unusable area. It is therefore inevitable to increase overall dimensions by an amount as great as this unusable area to provide a given size of effective operational area, which makes the whole touch panel bulky.

SUMMARY OF THE INVENTION

An optically transparent touch panel of this invention comprises an upper substrate provided with an upper conductive layer formed on a lower surface thereof, and a lower substrate provided with a lower conductive layer formed on an upper surface thereof in a manner to confront the upper conductive layer with a predetermined space, wherein the upper substrate and the lower substrate are bonded together with a spacer having a modulus of elasticity between $10^4$ and $10^6$ Pa.

DETAILED DESCRIPTION OF THE PREFERRED EMBODIMENT

Figure 1:
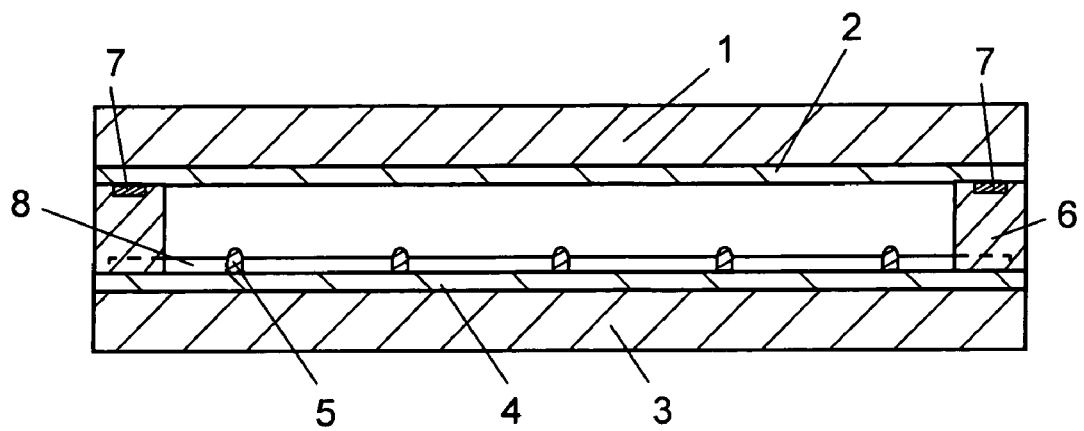
FIG. 1 is a cross sectional view of an optically transparent touch panel according to an exemplary embodiment of the present invention.
Figure 2:
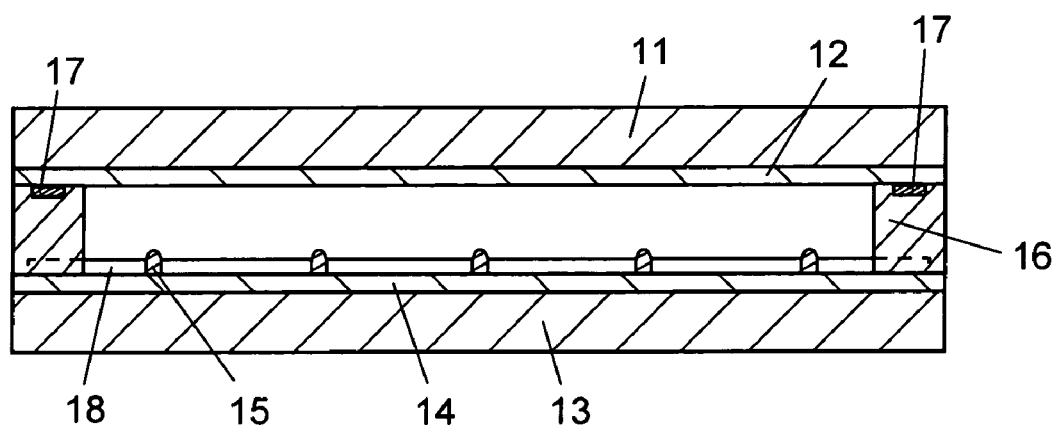
FIG. 2 is a cross sectional view of an optically transparent touch panel of the prior art.

FIG. 1 is a cross sectional view of an optically transparent touch panel according to an exemplary embodiment of this invention. Optically transparent upper substrate 1 has upper conductive layer 2 formed on a lower surface thereof. Upper substrate 1 consists of a polyethylene terephthalate film, a polycarbonate film and the like, and the upper conductive layer 2 is formed by vacuum spattering indium-tin oxide, tin oxide and the like. A pair of electrodes 7 is formed by printing silver paste, carbon paste and the like, and they are located at both ends of the upper conductive layer 2. Optically transparent lower substrate 3 made of a glass plate, acrylic resin, polycarbonate resin and the like has optically transparent lower conductive layer 4 formed on an upper surface thereof in the same manner as the upper conductive layer 2. A pair of lower electrodes 8 is also provided on an upper surface of the lower conductive layer 4 at both ends thereof in the like manner as the upper electrodes 7, but in a direction orthogonal to the upper electrodes 7. There are also plurality of dot spacers 5 formed at regular intervals in order to maintain a predetermined space from the upper conductive layer 2. The dot spacers 5 are formed of an insulation material such as epoxy and silicone. Spacer 6, which develops adhesion by heat curing, is composed of thermosetting resin having $10^4$ to $10^6$ Pa in modulus of elasticity with a principal component of epoxy composite, urethane composite or silicone composite, and it is formed by means of coating or printing. The spacer 6 is formed into a frame-like shape on any of the lower surface of the upper substrate 1 and the upper surface of the lower substrate 3 along the periphery thereof. The spacer 6 thus bonds together the upper substrate 1 and the lower substrate 3 along their periphery in a manner that the upper conductive layer 2 and the lower conductive layer 4 confront with respect to each other with a predetermined space therebetween, to constitute the optically transparent touch panel.

An epoxy composite suitable for the spacer 6 here is epoxy resin denatured with a rubber component such as polybutadiene, polyisoprene and polyacrylonitrile butadiene, that is rubber-denatured epoxy resin as is known.

Beside those listed above, any of silicone-denatured epoxy resin, fatty acid-denatured epoxy resin, and epoxy resin denatured with a component containing a conjugate double bond in fatty acid may be used as the epoxy composite for the spacer 6. In addition, urethane-denatured epoxy resin, polyether-denatured epoxy resin, and polysulfide-denatured epoxy resin may also be used.

Any of the above seven types of denatured epoxy resin can be used singly or in any combination of two or more.

In addition, any one or a combination of the above seven types of denatured epoxy resin can be used in further combination with an ordinary epoxy compound, as the epoxy composite for the spacer 6. The ordinary epoxy compound here includes such epoxy materials as bisphenol A type epoxy resin, novolak type epoxy resin, alicyclic type epoxy resin, biphenyl type epoxy resin, naphthalene type epoxy resin, (di-) glycidyl ester type epoxy resin, glycidyl amine type epoxy resin, and any of the above materials diluted with epoxy diluent. Some examples of the epoxy diluent are styrene oxide, alcoholic glycidyl ether such as butyl-glycidyl ether, glycidyl ester of carboxylic acid, certain types of silane such as glycidic hydroxypropyl trimetoxy silane.

A urethane composite suitable for use as the spacer 6 includes di-, tri- and tetra-polyisocyanates of monocyclic- and heterocyclic-aromatics, aliphatics, and/or alicyclics, or a mixture of any of the above. Or, a composite of any of the above group materials may be used by adding polyester polyol (diol or polyol) and polyether polyol (diol or polyol).

Further, a silicone composite suitable for the spacer 6 includes any such materials that have structures of di-methyl silicone, methyl vinyl silicone, methyl phenyl vinyl silicone, and fluoro silicone groups.

In addition, any of the above materials can be used together with a hardening agent. There is no specific limitation on the hardening agent of the epoxy composite, and one or more different kinds of hardening agent may be used as appropriate to the epoxy composite to be used together. Some examples of the hardening agent suitable here are amine, polyamine, amine adduct, amine salt, polyamide, imidazole derivative, dicyandiamide, ureic compound, melamine derivative, Lewis acidic salt, ketimine, acid hydrazide, acid anhydride, polythiol, sulfide derivative, phenolic resin, amino resin, and the like.

Also, the spacer 6 can be formed of any resin that can be hardened by irradiation of ultraviolet rays or an electron beam. Such resins that can be hardened by ultraviolet rays include radical polymerized hardening resin and cationic polymerized hardening resin. An example of the radical polymerized hardening resin is acrylic (vinyl polymerization type) resin with a principal component of (meta-) acrylic oligomer or (meta-) acrylic monomer having a urethane structure, which is to be added with a photo-polymerization initiator. Any of benzoyl alkyl ether, benzophenone, acetophenone and thioxanthone group materials may be used as the photo-polymerization initiator. Alternatively usable is polythiol polyene (addition polymerization type) resin with a principal component of polyene (allylic unsaturated resin) or polythiol (mercapto group containing resin) in combination with a photo-polymerization initiator of benzophenones. An example of the cationic polymerized hardening resin is epoxy-ring-opening polymeric resin with a principal component of any resin having an epoxy structure in combination with a photo-polymerization initiator of aromatic diazonium salt, aromatic halonium salt and aromatic sulfonium salt, which generate Lewis acid when subjected to light. Resins that can be hardened by an electron beam are radical polymerized hardening resin and cationic polymerized hardening resin, which can be hardened also by ultraviolet rays as described above. The method of hardening with an electron beam does not require the addition of any photo-polymerization initiator, since it can irradiate higher energy than ultraviolet rays to promote polymerization of the principal component.

Additionally, filler, plasticizer, solvent leveling agent and thixotropic agent may be added to the above materials as needed to control the viscosity. Materials suitable as the filler are silica, metallic oxides such as alumina, metal carbonate compounds such as calcium carbonate, metal sulfate compounds such as barium sulfate, metal silicate compounds such as talc, and the like.

The optically transparent touch panel constructed as above has the upper electrodes 7 and the lower electrodes 8 connected to a detector circuit in an electronic device. Using a finger, pen and the like, when a user depresses any point in an effective operational area, where is functional for depressing operation and detection of the depressed point on a surface of the upper substrate 1 other than a portion over the spacer 6, the upper substrate 1 deforms. This causes the depressed point of the upper conductive layer 2 to come into contact with the lower conductive layer 4. The detector circuit detects the depressed point according to a ratio of resistances between the upper electrodes 7 as well as that of the lower electrodes 8.

Details will be provided next in a concrete manner of a method of manufacturing the optically transparent touch panel that uses any such spacers 6 described above, and how it is evaluated.

First, bisphenol A type epoxy resin, amine hardener, silica filler and talc were mixed in a ratio of 100:7:15:40 by weight. Using this mixture, the spacer 16 was formed with a thickness of 50 μm and width of 3 mm in a manner as described in the background of the invention. Then, an optically transparent touch panel as the prior art example was produced, which is designated as sample No. 0.

Next, as a sample of epoxy composite according to this exemplary embodiment, first prepared was a composite comprising glycidyl ester type epoxy resin, amine hardener and silica filler. They were mixed in a ratio of 100:30:10 by weight. The mixture was heated at 150° C. for 30 minutes to form spacer 6 of 50 μm in thickness and 3 mm in width, and an optically transparent touch panel was produced, which is then designated as sample No. 1.

Further, a urethane composite was prepared as another sample, which comprises polyether polyol, methylethyl ketoxime block isocyanate, hardening accelerator (di-n-butyl tin dilaurate) and silica filler. They were mixed in a ratio of 100:30:1:10 by weight. The mixture was heated at 150° C. for 30 minutes to form spacer 6, and another optically transparent touch panel was produced, which is designated as sample No. 2.

Furthermore, a silicone composite comprising methyl vinyl silicone resin was heated at 150° C. for one hour to form spacer 6, and still another optically transparent touch panel was produced, which is designated as sample No. 3.

As a radical polymerized hardening resin, another mixture was prepared with urethane acrylate, which represents acrylic oligomer having a urethane structure, phenoxy ethylacrylate, photo polymerization initiator and silica filler. The mixing ratio was 100:95:6:10 by weight. The mixture was irradiated with ultraviolet rays of 800 mJ/cm² to form spacer 6, and an optically transparent touch panel was produced, which is designated as sample No. 4.

Furthermore, as a cationic polymerized hardening resin, still another mixture was prepared with epoxidized polybutadiene, which represents a resin of an epoxy structure, polycaprolactone triol, photo polymerization initiator (triphenyl sulfonium hexafluorophosphate derivative) and silica filler. The mixing ratio was 100:100:3:10 by weight. The mixture was irradiated with ultraviolet rays of 1000 mJ/cm² to form spacer 6, and an optically transparent touch panel was again produced, which is designated as sample No. 5.

In addition to the above, another mixture was prepared with urethane acrylate, which represents acrylic oligomer having a urethane structure, polyethylene diacrylate and filler. The mixing ratio was 100:80:10 by weight. This mixture was irradiated by electron beam of 20 kJ/kg to form spacer 6, and an optically transparent touch panel was produced, which is designated as sample No. 6.

Furthermore, another composite was prepared which comprises polybutadiene rubber-denatured epoxy resin, polyamine hardener, and silica filler. The weight ratio of this mixture is 100:35:5. This mixture was heated at 150° C. for 30 minutes to form spacer 6 of 50 μm in thickness and 3 mm in width, and another optically transparent touch panel was produced, which is designated as sample No. 7.

Moreover, still another composite was prepared by mixing urethane-denatured epoxy resin, hardener of dicyandiamide and silica filler with a weight ratio of 100:30:25. This mixture was also heated at 150° C. for 30 minutes to form spacer 6 in the like manner, and another optically transparent touch panel was produced, which is designated as sample No. 8.

Table 1 shows modulus of elasticity in relation to loss tangent, which is defined as a ratio of viscous component to elastic component for each of the above samples, No. 0 to No. 8.

TABLE 1

| Sample No. | Specifications | Modulus of Elasticity (Pa) | Loss Tangent | Usable Life to Wear (no. of strokes) |
|---|---|---|---|---|
| 0 | Epoxy Heating | $3.2 \times 10^7$ | 0.05 | 100 |
| 1 | Epoxy Heating | $1.3 \times 10^5$ | 0.06 | 70,000 |
| 2 | Urethane Heating | $1.3 \times 10^5$ | 0.20 | 35,000 |
| 3 | Silicone Heating | $8.0 \times 10^4$ | 0.06 | 100,000 |
| 4 | Radical Polymerization UV-Rays Irradiation | $1.5 \times 10^5$ | 0.11 | 50,000 |
| 5 | Cationic Polymerization UV-Rays Irradiation | $2.2 \times 10^5$ | 0.42 | 15,000 |
| 6 | Radical Polymerization Electron Beam Irradiation | $2.5 \times 10^5$ | 0.18 | 25,000 |
| 7 | Polybutadiene Rubber-denatured Epoxy Heating | $1.0 \times 10^4$ | 0.05 | 150,000 |
| 8 | Urethane-denatured Epoxy Heating | $8.5 \times 10^6$ | 0.25 | 8,000 |

The optically transparent touch panels of the sample numbers 0 through 8 were evaluated. A pen having a pen point of 0.8 mm diameter made of polyacetal resin was slid reciprocally for a distance of 20 mm along a track 1.5 mm inside of and in parallel with the spacer 6, while applying a downward pressure of 500 g. Following the above, resistance was measured on a depressed point, and a ratio of this resistance value to the initial resistance was determined as to whether it was within a predetermined value. A usable life is defined here as a number of strokes of the reciprocal sliding motion when the ratio of resistances exceeds the predetermined value.

As is obvious from Table 1, the sample numbers 1 through 8 of this exemplary embodiment exhibit $10^4$ to $10^6$ Pa in modulus of elasticity, which is a substantial improvement over the sample number 0 of the prior art which shows the modulus of elasticity of $3.2 \times 10^7$.

Also, it is known through comparison among the sample numbers 1 and 2, as well as between sample numbers 4, 5 and 6 that any of them having a smaller value of loss tangent shows an increased usable life even though their moduli of elasticity are generally equal.

In this exemplary embodiment, as described, the upper substrate 1 provided with upper conductive layer 2 formed on the lower surface thereof and the lower substrate 3 provided with lower conductive layer 4 formed on the upper surface thereof in a manner to confront the upper conductive layer 2 with a predetermined space are bonded together with the spacer 6 having a modulus of elasticity between $10^4$ and $10^6$ Pa. The optically transparent touch panel is then constructed. When the touch panel is depressed in the vicinity of the spacer 6, the spacer 6 shrinks in response to the compressive force since it has the moderate elasticity between $10^4$ and $10^6$ Pa. Because this reduces bending stress of the upper conductive layer 2 in an area around an edge of the spacer 6, it is not likely to cause fatigue so easily. In addition, the touch panel as a whole can be downsized while keeping the required effective operating area because the area near the spacer 6 can also be used as the effective operating area.

If spacer 6 has a modulus of elasticity of less than $10^4$ Pa, the spacer is considered too soft such that it does not restore itself easily into the original shape when the touch panel is depressed near the spacer, and in an extreme case, the spacer turns into a gel-form, which is difficult to use for practical purposes. On the other hand, the touch panel poses the same problem as before, if the modulus of elasticity exceeds $10^6$ Pa.

Furthermore, it is desirable to maintain 0.5 or less in loss tangent of the spacer 6. If loss tangent of the spacer 6 is greater than 0.5, the spacer 6 becomes too soft and loses restorability. In other words, the smaller the value of loss tangent, the less viscosity and the easier the spacer 6 is to restore in shape. The spacer 6 can thus return into the original shape immediately after completion of a depressing operating near the spacer 6, so as to shorten the duration of stress imposed on the upper conductive layer 2 around the edge of the spacer 6. This can further reduce the fatigue, and hence increases the usable life against the sliding operation. On the other hand, a lower limit of the loss tangent is approximately 0.05. Any composite having a smaller value than that is required to use a resin that has rigid molecular structure. Such a resin is not adequately deformable, however, to satisfy the function of elastic spacer, since it generally has physical properties of high modulus of elasticity and hardness.

When the spacer is formed with radical polymerized hardening resin or cationic polymerized hardening resin that hardens by irradiation of an electron beam, the addition of photo polymerization initiator is not needed. The method of hardening with an electron beam can form the spacer easier, since it can irradiate higher energy than ultraviolet rays to promote polymerization of the principal component.

As described above, an advantage according to the present invention is to provide the optically transparent touch panel that has a long life with the capability of downsizing the whole body while keeping the required effective operating area.

What is claimed is:

1. An optically transparent touch panel comprising:
   an upper substrate having an upper conductive layer formed on a lower surface thereof;
   a lower substrate having a lower conductive layer formed on an upper surface thereof to confront said upper conductive layer with a predetermined space therebetween; and
   a spacer disposed between outer peripheries of said lower surface of said upper substrate and said upper surface of said lower substrate, said spacer bonding together said upper substrate and said lower substrate, wherein
   said spacer has a modulus of elasticity of at least $1.0 \times 10^4$ Pa and lower than $8.0 \times 10^4$ Pa.

2. The optically transparent touch panel of claim 1, wherein said spacer has a loss tangent of at least 0.05 and at most 0.5.

3. The optically transparent touch panel of claim 1, wherein said spacer comprises a member from a group consisting of radical polymerized hardening resin hardened by ultraviolet rays or an electron beam, and cationic polymerized hardening resin hardened by ultraviolet rays or an electron beam.

4. The optically transparent touch panel of claim 3, wherein said radical polymerized hardening resin comprises a member from a group consisting of acrylic type resin and polythiol polyene type resin.

5. The optically transparent touch panel of claim 3, wherein said cationic polymerized hardening resin comprises epoxy-ring-opening polymeric resin having an epoxy structure.

6. The optically transparent touch panel of claim 1, wherein said spacer includes a member from a group consisting of epoxy composite, urethane composite and silicone composite.

7. The optically transparent touch panel of claim 6, wherein said epoxy composite includes at least epoxy resin denatured with a member from a group consisting of rubber, silicone, fatty acid, fatty acid therein containing double bond, urethane, polyether, and polysulfide.

8. The optically transparent touch panel of claim 7, wherein said epoxy composite includes at least rubber-denatured epoxy resin using a member from a group consisting of polybutadiene, polyisoprene and polyacrylonitrile butadiene.

9. The optically transparent touch panel of claim 6, wherein said urethane composite includes a member from a group consisting of an aromatic di-polyisocyanate, an aliphatic di-polyisocyanate, an alicyclic di-polyisocyanate, an alicyclic tri-polyisocyanate, and an alicyclic tetra-polyisocyanate.

10. The optically transparent touch panel of claim 6, wherein said silicone composite has a structure from a group consisting of di-methyl silicone group, methyl vinyl silicone group, methyl phenyl vinyl silicone group, and fluoro-silicone group.

* * * * *